Oct. 8, 1940. W. J. BRYANT 2,217,509
GAUGE
Filed Nov. 18, 1937 2 Sheets-Sheet 1
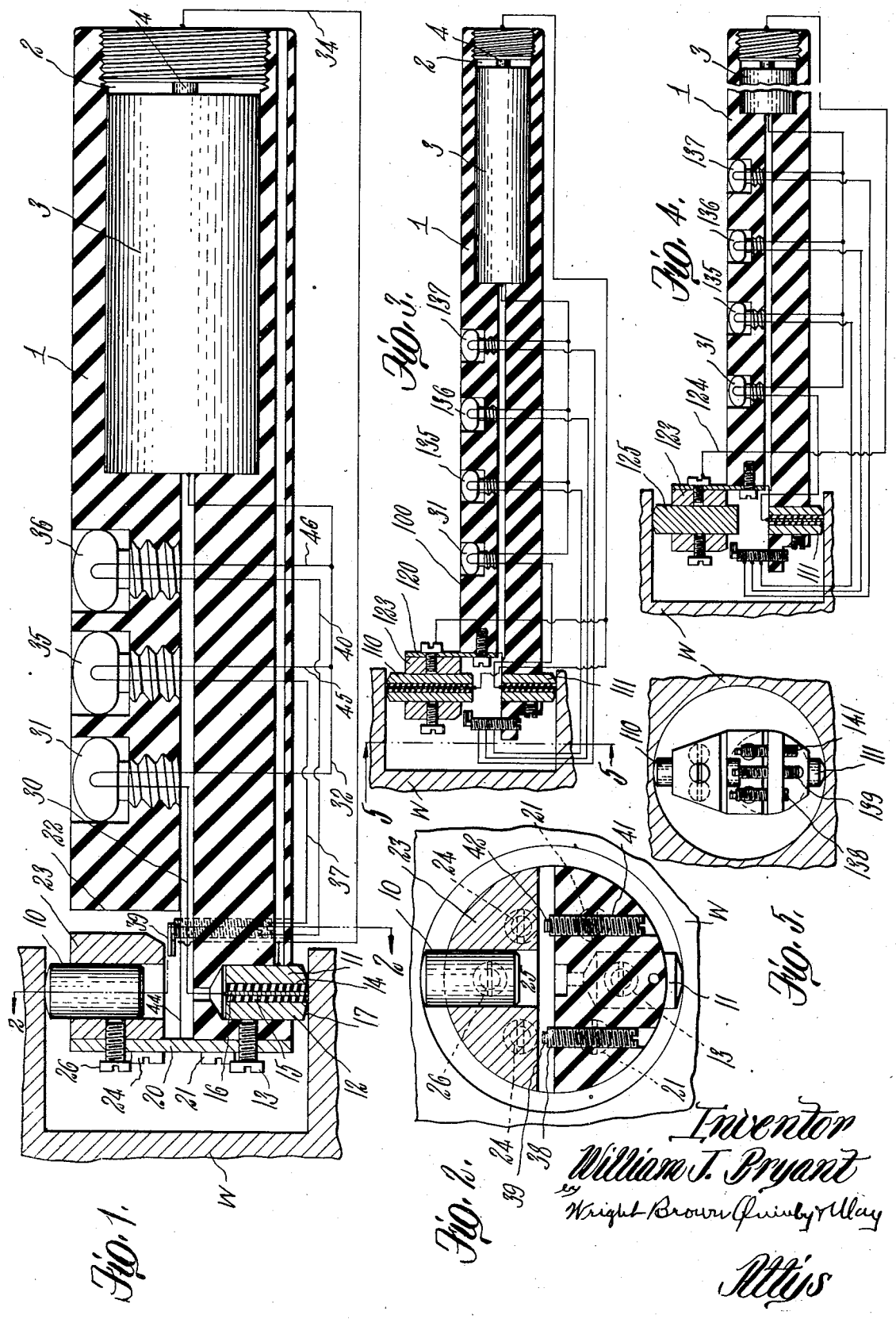
Inventor
William J. Bryant
by Wright, Brown, Quinby & May
Attys

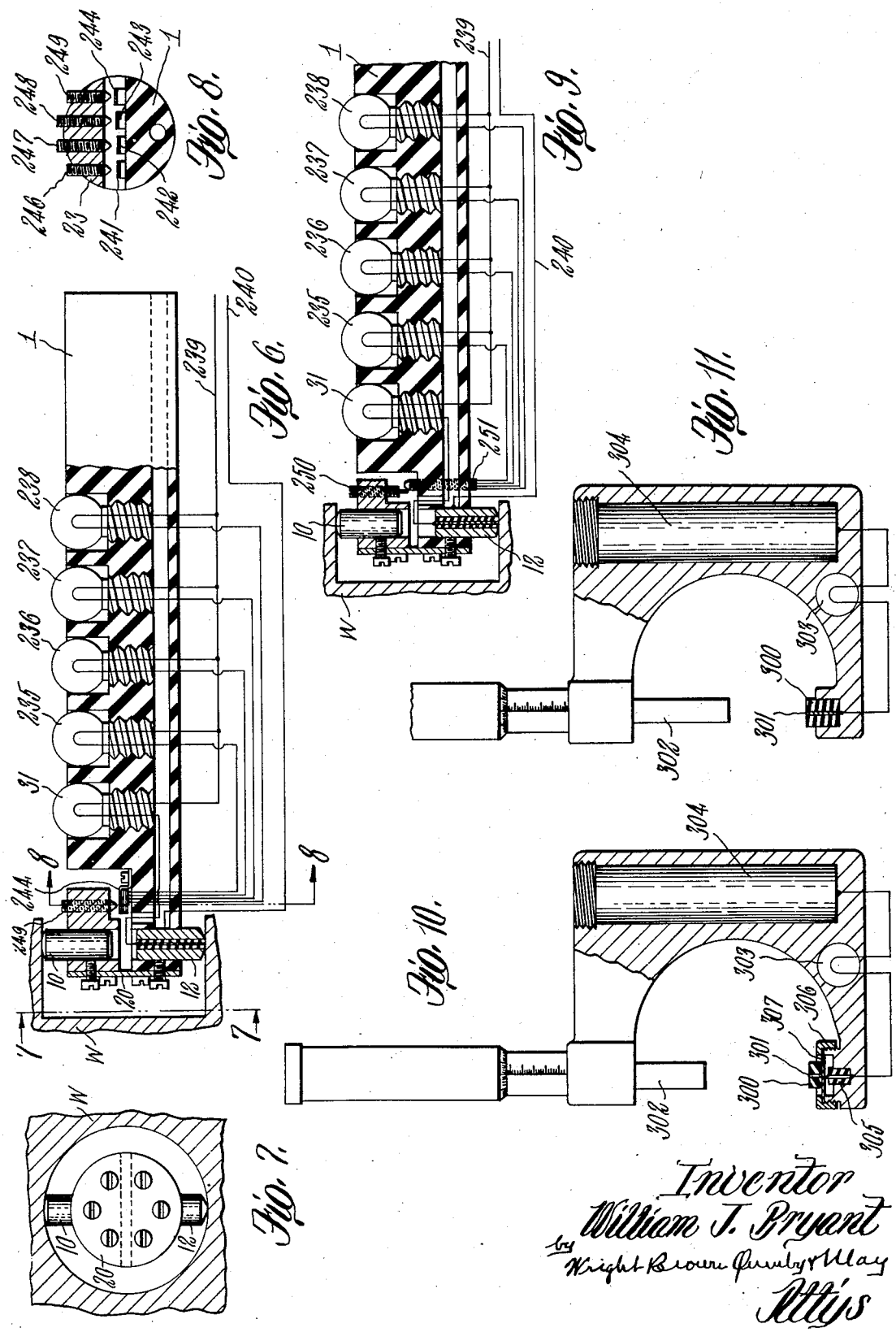

Patented Oct. 8, 1940

2,217,509

UNITED STATES PATENT OFFICE 2,217,509

GAUGE

William J. Bryant, Springfield, Vt.

Application November 18, 1937, Serial No. 175,272

4 Claims. (Cl. 177—311)

This invention relates to gauges for measuring either inside or outside diameters and has for one object to provide a gauge which will indicate by a system of lights whether or not the size of the work is that desired.

A further object is to provide a gauge which indicates when it is correctly presented to the work, so that correct gauging may be insured. For example, in the measurement of holes it is important that the measuring be done in a manner to include the true maximum diameter. With some types of gauges heretofore employed the correct positioning of the gauge has been determined by "feel." In others the gauge has been moved about and a maximum reading taken. Both methods depend for accuracy on the skill and care of the operator. In accordance with the present invention, however, means are provided for positively indicating when the gauge is correctly presented to the work so that the accuracy is not dependent on the skill or particular care of the user.

For a more complete understanding of this invention, reference may be had to the accompanying drawings, in which Figure 1 is a central longitudinal section through an internal gauge embodying this invention.

Figure 2 is a section on line 2—2 of Figure 1.

Figures 3 and 4 are sections similar to Figure 1, but to a smaller scale and showing modified constructions.

Figure 5 is a section on line 5—5 of Figure 3.

Figure 6 is a section similar to Figures 3 and 4, but showing a further modification.

Figures 7 and 8 are sections on lines 7—7 and 8—8, respectively, of Figure 6.

Figure 9 is a view similar to Figure 6, but showing still another modification.

Figures 10 and 11 are views partly in elevation and partly in section of external gauges embodying certain features of the invention.

Referring first to Figure 1, at 1 is indicated a gauge body which as shown is made of insulating material, and which is provided in its handle end portion with a socket 2 in which may be placed a battery 3 of the type commonly employed for flash lights. The outer end of this socket 2 may be closed as through a screw plug which may make contact with the central terminal 4 of the battery 3. The other end portion of the body 1 carries a plurality of work-engaging elements 10 and 11, two such elements being shown positioned diametrically opposite to each other though three, or in some cases, more might be used.

The element 11 is shown as comprising a metal plug 12 which may be fixed to the body 1 in adjusted axial relation as by means of a set screw 13. This plug 12 is provided with a central axial bore 14 within which is positioned an insulating sleeve 15 and through this sleeve extends a conductor 16. This conductor presents at the outer end of the plug 12 a terminal conductive area small with respect to the total end area of the plug, the marginal portions of this plug area about the periphery being rounded off, as shown at 17, so as to facilitate the entrance of the gauge into the work.

A flexible disk of metal or other suitable material at 20 is secured as by a screw 21 to the end of the body portion 1 adjacent to the plug 12, this body portion for substantially one-half its area being cut back as at 22 to provide room for the block 23, which is secured to the free edge portion of the disk 20 as by the screws 24. This block 23, as shown best in Figure 2, is segmental in shape and has a bore 25 within which is secured the contact or plug 10 as by means of a set screw 26. The outer end of this plug 10 is rounded off, the rounded end portions of this plug and of plug 12 facilitating the entrance of the end portion of the gauge into the work which is shown at W. It will be understood that the disk 20 normally holds the block 23 in such a position that the over-all length between the ends of the plugs 10 and 12 is somewhat greater than the desired size of the hole to be measured so that as the end of the gauge is forced into the hole, the disk 20 is flexed and the inner edge of the block 23 is brought nearer to the central axis of the body 1.

When the gauge is in proper gauging position in which the axes of the plugs 10 and 12 are arranged in the maximum diameter of the circular opening to be gauged and perpendicular to the axis of this opening, the outer end of the conductor 16 and the inner edge of the opening through the plug 11 are in electrical connection through the material of the work piece W which is shown as of metal. In this position the work piece acts as a switch element, closing electrical connection between the plug 11 and the conductor 16 which closes a circuit from this conductor 16 through a wire 30 and lamp 31, lead 32 and battery 3, terminal 4 and line 34 back to the plug 11. Thus the lamp 31 lights when the gauge is correctly positioned within the work for a true gauging action. The end of the conductor 16 is so small in area that only a slight "cocking" of the body 1 relative to the work will serve to break the circuit between the work and this conducting element so that it is necessary for the light 31 to light that the gauge elements 10 and 11 be correctly related to the work. The lamp 31, therefore, provides a visible indication of the correctness of positioning of the gauge for a true gauging measurement. While the surface area of the plug 11 in contact with the work is of substantially the curvature of the work, this curvature may be zero (a plane), and since this contacting surface is very small it may approach or even be zero even though the face of the work is curved.

Other lamps may be used to indicate the size of the hole being gauged. Two such lamps are shown at 35 and 36, respectively. One terminal of the lamp 35 is shown as connected through the lead 37 with an adjustable contact terminal screw 38 threaded through the body portion 1 adjacent to the block 23 and carrying at its inner end a spring contact finger 39. Similarly the lamp 36 is connected through a lead 40 with an adjustable contacting screw 41 provided with a spring contact 42 at its inner end. The block 23 is in electrical connection as through the plate 20 and lead 44 with the lead 34 to one side of the battery while the opposite terminals of lamps 35 and 36 are connected through the leads 45 and 46, respectively, to the lead 32 extending to the opposite side of the battery. The screws 38 and 41 are adjusted to bring their spring terminals at different distances from the block 23 so that as the block 23 is deflected inwardly as the gauge is inserted into the hole to be measured, it will first contact with one of these spring contacts, either 39 or 42 to light the corresponding lamp 35 or 36, and if the hole is small enough it is brought still further inwardly to contact with the other spring contact 39 or 42 and cause the other of the lamps 35 or 36 to light. These screws may be so adjusted that one of the lamps 35 or 36 will light when the hole to be gauged is just within the maximum tolerance limit, and both will be lighted when the hole to be gauged is too small being just outside the minimum tolerance limit. Thus when the gauge is inserted in the hole to be measured and the lamp 31 lights, it will be known that the gauge is correctly positioned for a gauging action. If both the lamps 35 and 36 light concurrently with the lamp 31, it will be known that the hole is too small, while if only one of the lamps 35 or 36 lights concurrently with the lamp 31, it will be known that the hole is within the desired tolerance limits, since one of these lamps will fail to light when the hole is within the minimum tolerance and both lamps will fail to light should the hole be larger than the maximum tolerance limit.

In Figure 3 a modified construction is illustrated in which the movable block 123 is carried by the spring segment 120 from the cut away portion of the body 100 and both of the work-contacting plugs 110 and 111 are provided with central conducting areas insulated from the remainder of the plug. Beside the lamp 31, which is connected to indicate the correct positioning of the gauge in the hole to be gauged, three instead of two size indicating lamps are employed, these being shown at 135, 136 and 137 and connected to three relatively adjustable contact screws 138, 139 and 141 as shown best in Figure 5. One of these lamps 135, 136 and 137 may be set to light when the work is just within high limit of tolerance, and the other may be set to light just below the low limit of tolerance and they may be differently colored, if desired, in order to facilitate determination of the indication. The third may be caused to light at an intermediate size as when the hole is of just the right size.

Figure 4 shows a construction similar to Figure 3, with the exception that the yielding plug 125 is unprovided with any central insulating sleeve and inner contact such as is shown in Figure 3, but is instead constructed similarly to the plug 10 of Figures 1 and 2, and the plug 111 is out of electrical connection with the battery while the plug 125 and block 123 forms the return through the lead 124. The arrangement of the lamps is identical with that shown in Figure 3.

In Figures 6, 7 and 8 a further modification is shown in which beside the lamp 31, the lighting of which indicates the correct positioning of the gauge relative to the work, there are four size indicating lamps 235, 236 and 237 and 238, and, instead of a battery being used, the leads 239 and 240 are connected to some external source of power (not shown). Each of the lamps 235, 236, 237 and 238 is connected to its own spring contact 241 and 244, respectively, with which cooperates the relatively adjustable screw contacts 246, 247, 248 and 249, as shown best in Figure 8. With this increased number of size-indicating lamps intermediate size indications within the tolerance limits may be given, thus giving the user a more accurate determination of the exact size of the hole with relation to the tolerance limits. This is a particularly desirable gauge for use at the machine, the additional lamps acting as a warning to the operator as proper size is approached.

In Figure 9 the same arrangement as illustrated in Figures 6, 7 and 8 is employed, except that the yielding contacts are shown as carried by adjustable screws such as 250 and they cooperate with adjustable screws such as 251 carried in the gauge body.

In Figures 10 and 11 is illustrated applications of the correct position determination of the gauge with respect to the work as applied to an external gauge. In Figure 11 a micrometer external gauge is illustrated having the insulated plug 300 provided with a central conductor 301, this plug 300 acting as a fixed anvil for cooperation with the movable gauging element 302. When the work is correctly positioned between this anvil and the element 302, a circuit is established through the conductor 301, the lamp 303, battery 304, and the movable contact 302 back to the work, while when the lamp 303 does not light it indicates that the work has not been correctly positioned between the anvil and the gauging element 302. In Figure 10 a further modification is shown in which the insulating anvil 300 is carried by a spring disk 307 which holds it normally slightly spaced from a contact block 305. The spring disk 307 is secured in position, as by a threaded collar 306. Besides requiring the correct positioning of the work to be gauged between the anvil and the gauging element 302, this construction also requires that sufficient pressure be exerted to bring the conductor 301 into contact with the contact plug 305 in order to light the lamp 303. This construction requires a definite pressure against the work as well as a correct positioning of the work in the gauge for the lamp 303 to become energized, and where, as in common practice in gauges of this type, means are provided for preventing an excessive pressure, this construction then eliminates any uncertainty in correct gauging either through variations of pressure on the work or incorrect positioning of the work with respect to the gauge.

From the foregoing description of certain embodiments of this invention, it should be evident to those skilled in the art that various changes and modifications may be made without departing from the spirit or scope of this invention as defined by the appended claims.

I claim:

1. A gauge having a plurality of spaced relatively movable contacting members, at least one of said members having a work contacting face provided with an element, said face, including said element, having a curvature substantially equal to the contacting curvature of the work at the point of contact and said element forming such a small portion of said face that it contacts with the work only when said gauge is in proper gauging relation to the work, and means indicating when said element is in contact with the work.

2. A gauge for measuring electro-conductive work, said gauge having a plurality of spaced relatively movable work contacting members, at least one of said members having a work contacting face, an electro-conductive element within the area of said face and out of electrical communication with the remainder of said face, said face, including said element, having a curvature substantially equal to the contacting curvature of the work at the point of contact, and said element being so small in area that it is in contact with the work only when said gauge is in proper gauging relation thereto, and electric indicating means operative through contact of said element and the work.

3. A gauge for measuring electro-conductive work, said gauge having a plurality of spaced relatively movable work contacting members, at least one of said members having a work contacting face, an electro-conductive element within the area of said face and out of electrical communication with the remainder of said face, said face including said element having a curvature substantially equal to the contacting curvature of the work at the point of contact, and said element being so small in area that it is in contact with the work only when said gauge is in proper gauging relation thereto, and acting with the work as an electric switch, a source of electric power, and an electric lamp connected to said source by the closing of said switch to indicate by the lighting of said lamp when said gauge is in proper gauging position relative to the work.

4. A gauge having a plurality of work engaging members, one of said members being metal and presenting a surface for engaging the work and presenting an electro-conductive element of small area insulated from the remainder of said surface, said surface including an element presenting a curvature substantially equal to the contact curvature of the work at the point of contact, said element and said member outside of said element being in contact with the work when said gauge is in proper position for gauging, a source of electric power, and a signal, said signal and source of power being in circuit with said element and member, said signal being operatively connected to said source to be operated when both said element and member contact with electro-conductive work being measured and defining a position of the gauge with respect to the work for proper gauging.

WILLIAM J. BRYANT.